United States Patent
Yamazaki et al.

[15] 3,661,065

[45] May 9, 1972

[54] DEVICE FOR OPTICAL FOCUSING A GLASS FIBER PLATE AS A FOCUSING SCREEN

[72] Inventors: Yasuo Yamazaki; Mitsuo Furuta, both of Osaka; Yoshio Kuramoto, Saka-shi, all of Japan

[22] Filed: Feb. 6, 1969

[21] Appl. No.: 797,021

[30] Foreign Application Priority Data

Nov. 25, 1968 Japan..................................43/85603
Feb. 9, 1968 Japan....................................43/8117
Feb. 8, 1968 Japan....................................43/7829
Apr. 1, 1968 Japan..................................43/21282

[52] U.S. Cl...............................95/44 R, 95/11 V, 350/96 B
[51] Int. Cl..........................................................G03b 3/00
[58] Field of Search.......................95/44 R, 11 R; 88/1.5; 350/96 B

[56] References Cited

UNITED STATES PATENTS

3,187,627  6/1965  Kapany...........................350/96 B X
3,343,023  9/1967  Bishop..............................350/96 X
3,360,672  12/1967  Marshall.........................350/96 X

*Primary Examiner*—Joseph F. Peters, Jr.
*Assistant Examiner*—Richard L. Moses
*Attorney*—Watson, Cole, Grindle & Watson

[57] ABSTRACT

In an optical focusing system as in a finder optical system of a reflex camera or in an optical focusing system wherein an image on the focusing screen disposed on the focal plane is observed from the back of said screen whereby the focusing condition of the image forming optical system can be detected, the present invention relates to a device for optical focusing, utilizing a glass fiber focusing plate as a focusing screen, which is characterized in that said focusing screen is provided with an incident end face of an optical fiber plate composed of many optical fibers secured with one another in a parallel array. In order to observe through the light ray passing through the circumferential portion of the lens of the image-forming optical system, which comes into said incident end face, it is possible to observe at a position away from the optical axis of said image-forming optical system, on the back of said optical fiber plate.

13 Claims, 33 Drawing Figures

INVENTORS
YASUO YAMAZAKI
MITSUO FURUTA
YOSHIO KURAMOTO

BY Watson, Cole, Grindle & Watson
ATTORNEYS

INVENTORS,
YASUO YAMAZAKI
MITSUO FURUTA
YOSHIO KURAMOTO

BY Watson, Cole, Grindle & Watson
ATTORNEYS 3,661,065

DEVICE FOR OPTICAL FOCUSING A GLASS FIBER PLATE AS A FOCUSING SCREEN

This invention relates to a device for optical focusing, utilizing a glass fiber focusing plate as a focusing screen wherein, by observing an image formed by the image-forming optical system on the focusing plate disposed on the focal plane from the back of said plate, the focusing condition thereof is detected and thereby the focusing is easily effected.

BACKGROUND OF THE INVENTION

A focusing screen of a light-scattering nature such as that of ground glass has been used up to now as the focusing system of the image formation systems of cameras and other optical systems. However, owing to the diffusiveness of light in the light-scattering plane, much of incoming light holds its course and the greater the deviation from the course the smaller is the strength of the ray. Accordingly, nothing but a far smaller hollow confusion circle can be achieved as compared to a defocused image by the objective on the focusing screen. If the diffusiveness of the light-scattering plane is increased so as to obviate this defect, the portion of light which is inefficacious for observation is increased at the same time, and consequently, the image to be observed is darkened. This is a serious defect. Even when the light-receiving surface of a plate made of a sheaf of glass fiber is used in the place of a light-scattering plane, it only makes the image brighter by making observable the principal ray of the objective incident upon the focusing plate and the nearby ray, and the defocused image which is observable remains smaller than the defocused image on the focusing screen. Therefore, the use of glass fiber plate does not necessarily produce an improvement of the focusing.

SUMMARY OF THE INVENTION

This invention relates to an optical focusing system making use of glass fiber. The aim of the invention is to achieve a bright image made on the focusing screen by the objective and, when it is defocused, to make it possible to observe a defocused image nearly as large as the one made on the focusing screen by the objective. The distinctive features of the invention are as follows: To achieve the aim stated above, a light-receiving plate, which is composed of a sheaf of glass fiber, is used as a focusing plate; a viewing part is provided on which the ray through the circumference of the objective is incident. To achieve the aim stated above the said part is placed out of the optical axis of the objective. In order to place the said viewing part away from an optical axis of the image-forming lens, a focusing plate of glass fiber is used together with an optical system for the purpose of changing the direction of light. In order to achieve the above aim and to do so without a light-biasing optical system, (i) the perpendicular to the light-projecting surface of the glass fiber focusing plate is disposed at an angle to the axis of the glass fiber itself, or (ii) the axis of the glass fiber is bent.

BRIEF DESCRIPTION OF THE DRAWINGS

FIGS. 1 show the prior art light distribution characteristics of light incident upon the focusing screen of a light-scattering plane:

FIG. 1(A) illustrating the effect of light falling at right angles with the light-scattering plane, and FIG. 1(B) illustrating the effect of light falling at an angle with the light scattering plane.

FIG. 2 (A) shows the relation between each ray and the viewing part when the rays are concentrated to a point (hereinafter called point image) by the objective in front of the focusing screen in the optical focusing system using a generally known type of light-scattering plane.

FIG. 2 (B) illustrates the defocused image observable at that time and

FIG. 2 (C) shows the distribution of the strength of the light.

FIGS. 3 show how a ray incident upon a surface of a single rod of glass fiber reacts;

FIG. 3 (A) illustrating the effect wherein both end surfaces are at right angles with the straight axis of fiber;

FIG. 3 (B) illustrating the effect wherein the normals of the glass fiber surfaces are aslant to the straight axis; and FIG. 3 (C) illustrating the effect wherein the normal of the light-receiving surface is the same with the bent axis of the fiber and at the same time the normals of both surfaces are parallel with each other.

FIG. 4 (A) illustrates the projected rays incident on a viewing part: (i) when the light-receiving surface of the focusing plate composed of a sheaf of glass fibers, each of which is a fiber of the type shown in FIG. 3 (A), is used as a focusing screen and the rays are concentrated in front of it while the viewing part is placed on the optical axis of the objective as well as: (ii) when the viewing part is placed outside of the said axis and points at which the optical axis of the objective and the light-emitting surface of the focusing plate cross each other, which is the first example embodying the invention;

FIG. 4 (B) shows the defocused image observed from the viewing part of the optical axis; and FIG. 4 (C) shows the hollow confusion circle of the defocused image observed from the viewing part outside of the optical axis.

FIG. 5 (A) illustrates a second example embodying the invention, wherein the same type of glass fiber focusing plate along with a wedge-shaped prism as a direction-changing optical system are used together and the viewing part is placed on the optical axis of the objective; while FIG. 5 (B) shows the hollow confusion circle of the defocused image which is observed.

FIG. 6 (A) shows a third example of the invention put into practice, wherein the same kind of glass fiber focusing plate is used as a reflex finder together with a modified pentaprism used as a direction-changing optical system; while FIG. 6 (B) shows the hollow confusion circle of the defocused image which is observed.

FIG. 7 (A) illustrates a fourth example of the invention put into practice wherein a wedge-shaped prism is added as a direction-changing optical system to that shown in FIG. 6 (A) with the eye-piece of the viewing part being made movable; while FIGS. 7 (B) and (C) show the various hollow confusion circles of defocused images corresponding to the various positions of the eye-piece.

FIGS. 8 are those of the movable eye-piece of the viewing part;

FIG. 8 (A) being its partial cross-sectional view from the side and

FIG. 8 (B) its front view.

FIG. 9 (A) is a fifth example of an embodiment of the invention, in which the differences from that illustrated in FIG. 4 (A) are as follows: the light-projecting surface of the glass fiber focusing plate is used as a light-scattering plane while a viewing part is placed on the optical axis of the objective.

FIG. 9 (B) shows the defocused image observed and

FIG. 9 (C) shows the distribution of strength of the light.

FIG. 10 (A) illustrates a sixth example of an embodiment of the invention, wherein the light-receiving surface of the focusing plate, comprised of a sheaf of glass fiber the normals of both surfaces of which are aslant to the axis of fiber, is used as a focusing screen and the viewing part is placed on the extension of the axis of incident ray.

FIG. 10 (B) shows the hollow confusion circle of the defocused image observable.

FIG. 11 (A) illustrates a seventh example of an embodiment of the present invention, wherein there is used a glass fiber focusing plate in the shape of wedge prism, the normal of the light-receiving surface of which is parallel to the axis of fiber and that of the light-projecting surface which is aslant to the axis.

FIG. 11 (B) shows the hollow confusion circle of the defocused image observable, and FIG. 11 (C) is a perspective of said focusing plate.

FIG. 12 (A) is a perspective of the focusing plate composed of two rotatable plates assembled together which are each the same as the one illustrated in FIG. 11 (C) but round in shape.

FIGS. 12 (B) and (C) show the manner in which the vertex angle of a wedge prism changes after rotation.

FIGS. 13 (A) is an eighth example of an embodiment of the invention which consists of glass fiber focusing plate, the normal of the light-receiving surface of which is parallel to the gently curved axis of the fiber and the normals of both surfaces of which are parallel with each other, and the viewing part on the extension of the objective.

FIG. 13 (B) shows the defocused image of a hollow confusion circle.

DESCRIPTION OF THE PREFERRED EMBODIMENT

Figure 1:
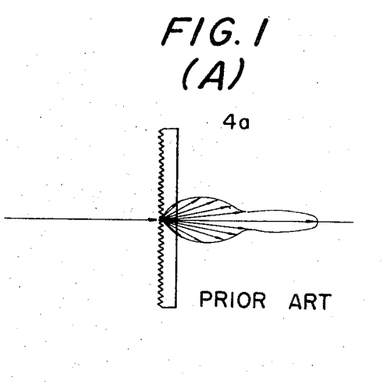
Figure 2:
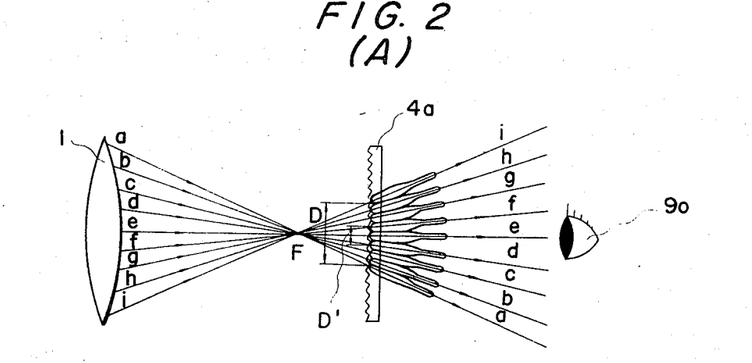

Before stating the details of the construction of the present invention, the prior art will be closely examined in order to make clearer the characteristics of the present invention and effects of the prior art thereon. In an optical system for focusing which makes use of the well-known light-scattering plane as a focusing screen, as is shown in FIG. 1 (A), the light ray is diffused and, the farther from the incident axis, the weaker is a ray when it falls on the light-scattering plane at an angle of $\theta$, as is shown in FIG. 1 (B). Therefore, when a point image F is produced by the objective lens 1 in front of a focusing plate 4a of a light-scattering nature and such image is observed by a viewing part, such as eye 90 on the axis of the incident ray, the rays $a, b, c$ and $g, h, i$ which come through the circumference of the objective 1 and are diffused by the light-scattering plane, hardly reach the eye 90. Those rays reaching the eye are chiefly the principal ray $e$ of the objective 1 and adjacent rays $d$ and $f$. It follows that, even though a hollow confusion circle of a diameter D is produced on the focusing screen, as shown in FIG. 2 B, the observable hollow confusion circle of the defocused image is such a small one having a diameter D' (see FIGS. 2B and 2C) that it is difficult to distinguish it from a focused point image. If the diffusiveness of the light-scattering plane is increased so as to overcome this defect, there is produced still another defect in that the confusion circle greatly darkens since that portion of diffused light which is not incident upon the eye greatly increases.

Figure 3:
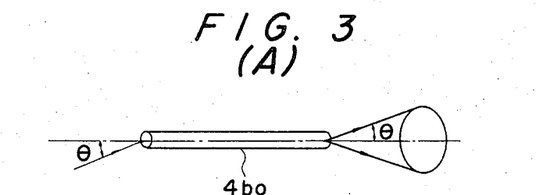
Figure 4:
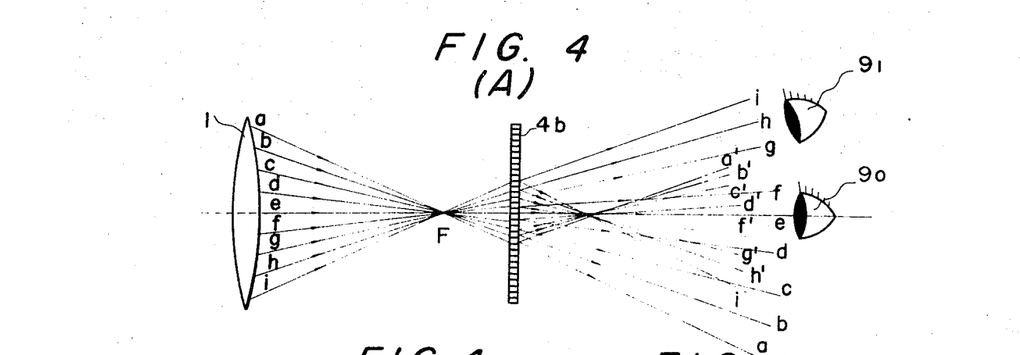

If a glass fiber focusing plate is used instead of the light-scattering plane, a single rod of glass fiber projects the incident ray as is shown in FIGS. 3. As illustrated in FIG. 3 (A) with a single rod of glass fiber 4bo whose both surfaces meet at right angled with the straight axis of the fiber, the ray falling upon the light-receiving surface at angle $\theta$ with the axis of fiber is diffused in the shape of a circular conical surface whose vertex angle is 20 from the light-projecting surface. As shown in FIG. 3 (B) the ray falling at an angle of $\theta$ with the normal on the single rod of glass fiber is projected in the shape of a circular conical surface whose vertex angle is $2(\theta -\alpha)$ and whose axis forms an angle of $\theta o$ with the normal of the light-projecting surface. There is a relationship between such angles of sin $\alpha = n_1$ sin $\theta o$, supposing that the refractive index of the glass fiber is $n_1$. In the example shown by FIG. 3 (C), the ray falling on the light-receiving surface of the glass fiber, the normal of whose light-receiving surface is parallel to the axis gently curving and the normals of both surfaces of which are parallel to each other at an angle of $\theta$ with the normal of the light-receiving surface, is projected in the shape of a circular conical surface whose vertex angle is $2\theta$ and whose axis forms an angle of $(\alpha - \theta o)$ with the normal of the light-projecting surface. Again there is a relationship between such angles of sin $= n$ sin $\theta o$. These phenomena are well known and the present invention makes use of them.

If the light-receiving surface of focusing plate 4b made of a sheaf of glass fiber, whose surfaces are right-angled with the straight axis of the fiber as is shown in FIG. 3 (A), is used as a focusing screen instead of the focusing plate 4a of the light-scattering plane of FIG. 2 (A), and the viewing part is placed on the optical axis, then the rays $a, b, c, d, e, f, g, h, i$ (among which $e$ is the principal ray) through the various parts of the objective produce a point image at F, diverge, and fall on the light-receiving surface at each incidental angle. They are then diffused from the light-projecting surface in the shape of a circular conical surface whose vertex angle is twice as large as the incident angle. Accordingly, the rays $a, b, c, d, e, f, g, h, i$ appear which are expressed by full lines, and $a', b', c', d', e', f', g', h', i'$, which form angles twice as large as the incident angles with them, are expressed by chain lines. Of these only the rays $d, e, f$ expressed by full lines and $d', e', f'$ expressed by chain lines reach the eye or viewing part 90 on the optical axis. Thus in this example only the principal ray coming through the center of the objective 1 and the adjacent ones are incident on the viewing part similar to the example wherein a light-scattering plane is used. The confusion circle observable is such a small one as shown in the FIG. 4 (B) that it is difficult to distinguish such circle from the focused point image. In this case, however, if the viewing part is removed from the optical axis and so placed as to observe the point at which the light-projecting surface and the optical axis cross one another, as for example, the rays $g, h, i$ expressed by full lines and $a', b'$ expressed by chain lines, those rays which pass the circumference of the objective 1 and of the defocused image on the focusing screen fall upon eye or viewing part 91 thereby making observable the hollow confusion circle of large diameter illustrated in FIG. 4 (A). This is the first example embodying the present invention. As can be judged from the above example, a viewing part and a glass fiber focusing plate on which the rays through the circumference of an objective are incident are indispensable to this invention. The defects of such first example are that the slant of the focusing screen to the viewing part becomes very large and that the image suddenly becomes dark when that part of the objective through which the rays $a, b, g, h, i$ pass is covered by the diaphragn so that the optical system for focusing necessarily becomes large-sized because the viewing part is placed outside of the optical axis, and that it is difficult to catch the object with cameras, for example, wherein the viewing part functions as a finder of the object.

Figure 5:
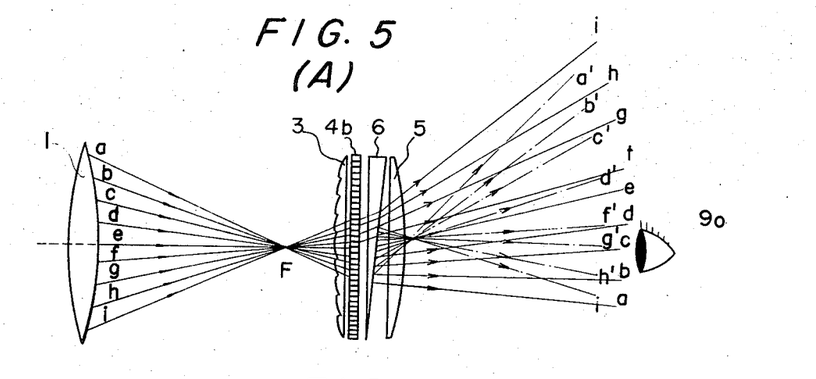

In a second example embodying the invention shown in FIG. 5(A), in order to obviate such defect during placing of the viewing part out of the optical axis of incidence, a wedge-shaped prism 6 is attached to the glass fiber focusing plate 4b. The principal ray is directed by means of such prism and the viewing part is placed on the extension of the axis of incidence. The rays from the point image, which is produced at F in front of the focusing screen by the objective 1, diverge, proceed through the Fresnel lens 3, fall on the focusing screen, which is the light-receiving surface of the glass fiber focusing plate 4b, diverge from the light-projecting surface in the shape of a circular conical surface whose vertex angle is twice as large as the incident angle, are given new directions by the wedge-shaped prism 6, and proceed through the condenser lens 5, with a portion of the rays being incident upon the viewing part 90 on the optical axis. The principal ray $e$ falls perpendicularly upon both the Fresnel lens 3 and the glass fiber focusing plate 4b but the direction of the projected ray, since it is changed by the wedge-shaped prism 6, does not fall upon the viewing part 90; while the rays $c, d$, expressed by full lines and $f', g', h'$ expressed by chain lines are instead incident upon it. Of the rays in the shape of a circular conical surface which cannot be clearly depicted on paper, all the rays that make the same angle with the optical axis such as $f', g', h'$ are incident upon it. Consequently, it is possible to observe such a hollow confusion circle of the defocused image having a large diameter as is shown in FIG. 5 (B).

Figure 6:
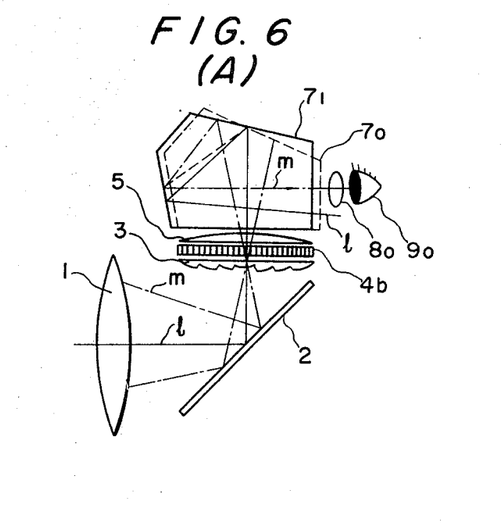

FIG. 6 (A) is an example of reflex finder, a third example embodying the present invention, using a modified pentaprism 71 as a direction-changing optical system in the place of a wedge-shaped prism. The image-forming ray through the objective 1 is curved at an angle of 90° by a reflex mirror 2 and, through a Fresnel lens 3, the image-forming ray falls upon the light-receiving surface of the glass fiber focusing plate 4b just as it does in the first and second embodiments of the invention. The diffused rays in the shape of a circular cone projected from the other surface are incident upon the modified pentaprism 71 through the condenser lens 5. This pentaprism is different from a common one such as 7o, shown in broken lines, in that its roof edge differs in angularity from the 71 pentaprism by $\theta_1$. The axis of this modified pentaprism is therefore displaced by $2\theta_1$ from that of the common one. Consequently, the principal ray $l$ of the objective 1, the ray $m$ through the objective's circumference, as well as the rays of m diffused in the shape of a circular cone, are all given new directions. It is not the principal ray $l$ but the oblique ray $m$ forming a certain angle with the principal ray that falls upon the viewing part, or eye-piece 80, on the axis of modified pentaprism 71 and the eye or viewing part 90 so that the hollow confusion circle having a large diameter of the defocused image, and shown in FIG. 6 (B), can be observed.

Figure 7:
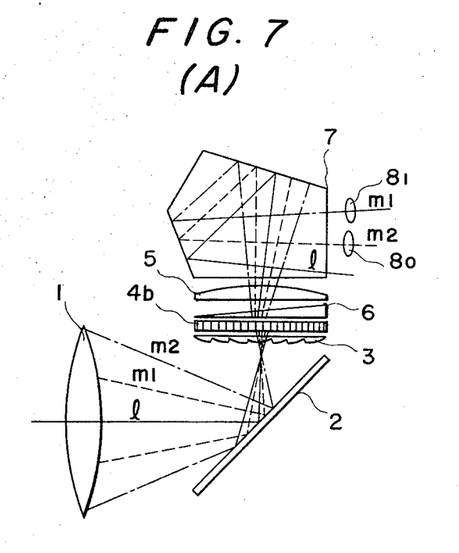
Figure 8:
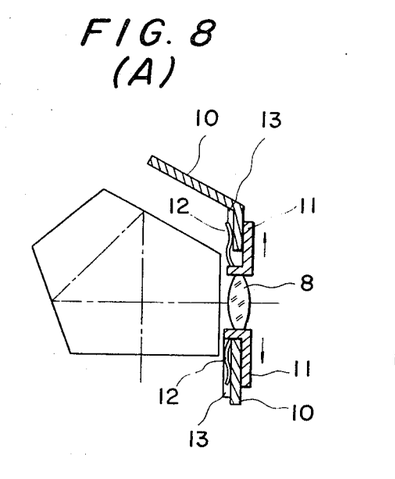

FIG. 7 (A) illustrates a fourth example embodying the invention, wherein both a wedge-shaped prism 6, of the type shown in FIG. 5 (A), and a modified pentaprism 71 are used as the optical system for the purpose of changing the direction of a ray, the viewing part being made movable from the axis of the modified pentaprism. In this case it is possible to reduce the vertex angle of the wedge-shaped prism and the deformed angle of the roof edge of the modified pentaprism. The latter may be even reduced to 0° when the modified prism is changed into a common one. There are numerous means available for making the viewing part movable, one of which is illustrated in FIGS. 8 (A) and (B). An aperture is provided on the back of a casing 10 of the modified pentaprism. A sliding plate 11, containing eye-piece 8 as a viewing part, is placed in the aperture. The sliding plate 11 is held by leaf springs 12 on the apertured wall of casing 10 and is regulated to move up and down along guide rails 13 on the apertured wall and is kept at a desired position by means of leaf springs 12.

Figure 9:
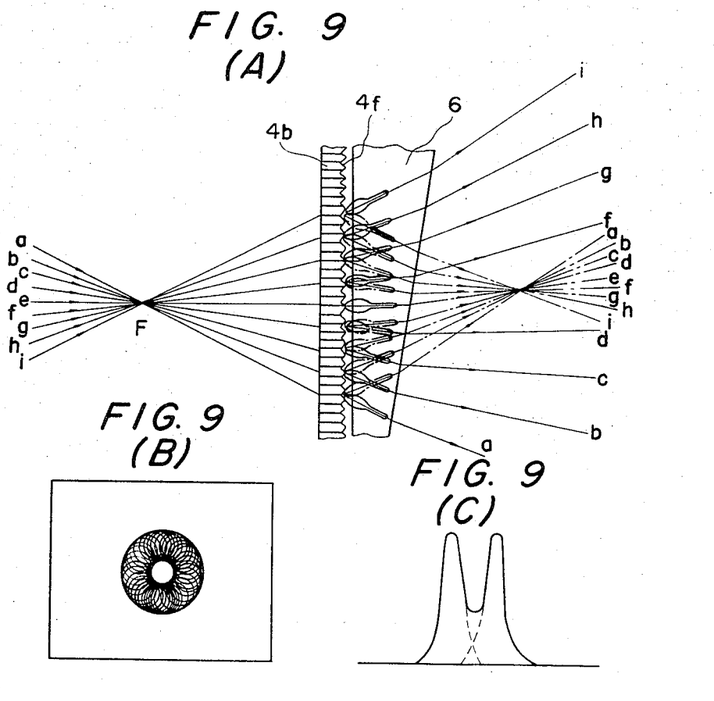

FIG. 9 (A) is a fifth example of the invention put into practice. The light-projecting surface of the above-described glass fiber focusing plate 4b, both surfaces of which make a right angle with the axis of fiber, is made into a light-scattering plane 4f and a wedge-shaped prism 6 is used as a direction-changing optical system. The projected light rays diffused in the shape of a circular cone are re-diffused by them and make the defocused image of a hollow confusion circle as in FIG. 9B. FIG. 9 (C) shows the distribution of the strength of light in the circle.

Figure 10:
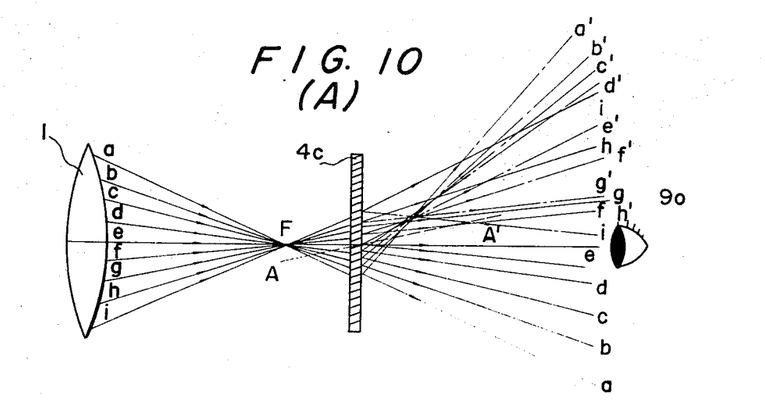

FIG. 10 (A), a sixth example embodying this invention, shows a focusing plate 4c of the type shown in FIG. 3 (B) which is a sheaf of glass fiber, the normals of both surfaces of which make an angle of $\theta$ with the axis and a viewing part 90 on the axis of incidence. By the former there are made on the plane of the paper the rays $a, b, c, d, e, f, g, h, i$ shown by the full lines and proceeding in the direction of the incident ray, and the rays $a', b', c', c', d', e', f', g', h', i'$, making an angle of $2(\theta - \alpha)$ with them. (Here $\sin \alpha = n_1 \sin \theta_0$). On the viewing part 90 the rays $d, e, f$, shown by the full lines and adjacent to the principal ray, and the ray $i'$ shown by chain line and through the circumference of the objective 1 are incident, and so it is difficult to observe the hollow confusion circle of the defocused image shown by the full line in FIG. 10 (B) and eccentric to the defocused image on the focusing screen shown by the broken line. This example has the advantage that the focusing screen does not suddenly darken even when the circumference of the objective lens is covered with the diaphragm.

Figure 11:
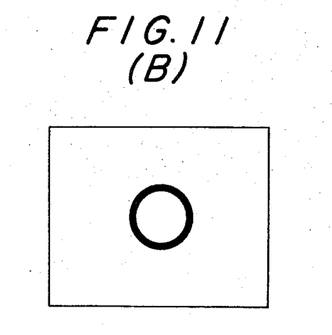

FIG. 11 (C) is a perspective of a focusing plate 4e depicting a seventh example embodying the present invention, specified by the fact that there is used a sheaf of glass fiber in the shape of wedge prism with the vertex angle $\theta o$, the light-receiving surface of the glass fiber making a right angle with the axis and the normal of light-projecting surface making an angle of $\theta o$. In this case, as is shown in FIG. 11 (A), the principal ray e diverges as a straight ray $e$ expressed by the full line and the ray $e'$ making an angle of $(\alpha - \theta o)$ with the straight ray and expressed by the chain line, after the projection from the focusing plate 4e. (Here $\sin \alpha = n_1 \sin \theta_0$). Therefore, on the viewing part 90 at the extension of the incident axis, the rays $e, f, g$, expressed by full lines, through the center of the objective 1 and the rays $b'$ and $c'$ expressed by chain lines are incident and the hollow confusion circle shown in FIG. 11 (B) is observable. In this case the slant of the image can be smaller than that of the image produced by the third example of FIG. 6 (A).

Figure 12:
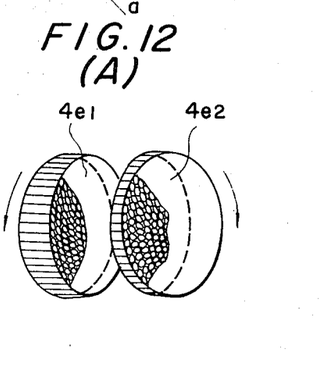

FIG. 12 (A) illustrates focusing plates of an eighth example embodying the invention. Such focusing plates 4e as are depicted in FIG. 11 (A) are circularly shaped and two of them, $4e_1$ and $4e_2$, are assembled together in a rotatable manner. By their rotation, the vertex angle of the wedge-shaped prism is changed at will. By placing them in such a position as is shown in FIG. 12 (B), the vertex angle will approximate 0°, while if they are placed in the position shown in FIG. 12 (C), the angle becomes the largest. Corresponding to the change of the vertex angle, the largeness of the diameter of the hollow confusion circle changes. Incidentally, two of the wedge-shaped prisms illustrated in FIG. 5 (A) and explained as a second example may be used together rotatably instead of the above focusing plates $4e_1$ and $4e_2$ in the shape of wedge-shaped prisms.

Figure 13:
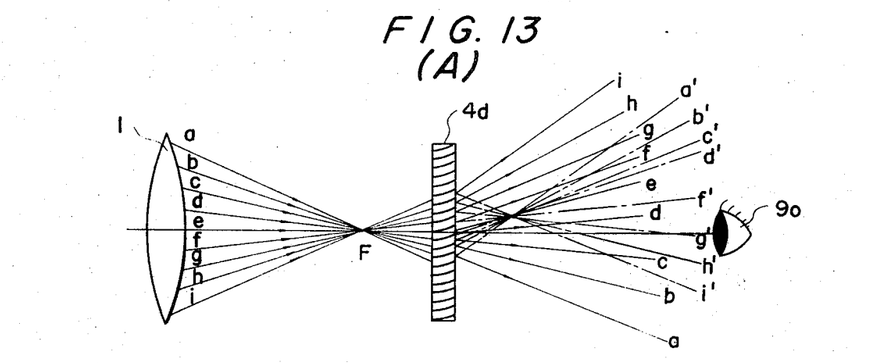

FIG. 13A is a ninth example embodying the invention, wherein the focusing plate 4d is made of a sheaf of glass fiber whose axis is gently curving as is depicted in FIG. 3 (C). On the viewing part 90 at the axis of the incident ray, the rays $b, c$, expressed by full lines, and the rays $g', h'$ expressed by chain lines and through the circumference of the objective 1, fall and make such a hollow confusion circle of a large diameter as is shown in FIG. 13 (B).

What is claimed is:

1. An image-forming optical system, comprising a light-converging means for forming images on an image plane, an optical fiber plate composed of single fibers secured to one another to form a parallel array, said fiber plate being so disposed such that one side thereof is coincident with the image plane, an optical biasing means disposed on the back of said fiber plate so that directions of light rays emitted from the fiber plate may be biased, a viewing part disposed at the position which is behind said biasing means in such manner that the optical axis of said viewing part is not coincident with a light ray incident upon the optical axis of said converging means and passing through said plate and said biasing means.

2. The image forming optical system as claimed in claim 1, wherein said optical biasing means comprises a wedge-shaped optical member.

3. The image-forming optical system as claimed in claim 1, wherein said optical biasing means comprises a modified pentaprism.

4. The image-forming optical system as claimed in claim 3, further including a wedge-shaped optical member to cooperate with said modified pentaprism for biasing the light rays.

5. The image-forming optical system as claimed in claim 3, wherein said eye-piece member is movable in a direction to cross the light rays emitted from said pentaprism.

6. In an optical focusing system as in a finder optical system of a reflex camera or in an optical focusing system wherein an image on the focusing screen disposed on the focal plane is observed from the back of said screen whereby the focusing condition of the image-forming optical system can be detected, comprising, a converging means an optical fiber plate serving as said focusing screen, said plate being composed of light-transmitting fibers secured to one another to form a parallel array, said fiber plate being so disposed that its one side will be made to coincide with said focal plane, and a viewing part disposed at a position which is behind said plate in such manner that the optical axis of said viewing part is not coincident with a light ray incident upon the optical axis of said converging means and passing through said plate.

7. The system according to claim 6 wherein both side planes of each said fiber of said fiber plate are parallel to one another and perpendicular to the longitudinal axes of said fibers, both sides of said fiber plate being parallel and perpendicular to the optical axis of said converging means, and the observing position being away from the optical axis.

8. The system according to claim 6 wherein said fibers of said fiber plate are provided with their longitudinal axes inclined at an oblique angle to the focal plane, both sides of said fiber plate being parallel to one another.

9. The system according to claim 6 wherein each said fiber of said fiber plate is slightly curved and the normals of both side planes of each said fiber are parallel to one another.

10. The system according to claim 6 wherein at least one side of said fiber plate is ground to produce a light-scattering plane.

11. In an optical focusing system as in a finder system of a reflex camera or in an optical focusing system wherein an image on the focusing screen disposed on the focal plane is observed from the back of said screen whereby the focusing condition of the image-forming optical system can be detected, comprising, a converging means for the system a wedge-shaped optical fiber means serving as said focusing screen, said fiber means being composed of light-transmitting fibers secured to one another to form a parallel array, said fiber means being so disposed that its one side coincides with said focal plane, and a viewing part disposed at a position which is behind said plate in such a manner that the optical axis of said viewing part is not coincident with a light ray incident upon the optical axis of said converging means and passing through said plate.

12. The system according to claim 11 wherein said optical fiber means comprises a plate, a normal of at least one side of each of said fibers being out of parallelism with the longitudinal axis of each said fiber.

13. The system according to claim 11 wherein said optical fiber means comprises two wedge-shaped fiber plates, each of said plates being independently rotatable for changing the vertical angle embraced by the light-receiving surface of one of said plates and the light-emitting surface of the other of said plates.

* * * * *

UNITED STATES PATENT OFFICE
CERTIFICATE OF CORRECTION

Patent No. 3,661,065  Dated May 9, 1972

Inventor(s) Yasuo Yamazaki; Mitsuo Furuta; Yoshio Kuramoto

It is certified that error appears in the above-identified patent and that said Letters Patent are hereby corrected as shown below:

On the title page, column 1, between the line "Inventors:" and the line "Filed:" insert -- Assignee: Minolta Camera Kabushiki Kaisha, Osaka, Japan. --

Signed and sealed this 9th day of January 1973.

(SEAL)
Attest:

EDWARD M. FLETCHER, JR.  ROBERT GOTTSCHALK
Attesting Officer  Commissioner of Patents